United States Patent [19]
Wagner

[11] Patent Number: 5,130,713
[45] Date of Patent: Jul. 14, 1992

[54] IFF SYSTEM COOPERATING WITH FURTHER POSITION FINDING DEVICE

[75] Inventor: Gerhard Wagner, Schaftlach, Fed. Rep. of Germany

[73] Assignee: Siemens Aktiengesellschaft, Berlin and Munich, Fed. Rep. of Germany

[21] Appl. No.: 704,304

[22] Filed: Jul. 12, 1976

[30] Foreign Application Priority Data

Jul. 10, 1975 [DE] Fed. Rep. of Germany ....... 2530841

[51] Int. Cl.⁵ ..................... G01S 13/78; G01S 13/86
[52] U.S. Cl. .......................................... 342/45; 342/54
[58] Field of Search ............... 343/6 R, 6 ND, 6.5 R, 343/6.5 LC; 342/43, 45, 54

[56] References Cited

U.S. PATENT DOCUMENTS

| | | | |
|---|---|---|---|
| 3,754,249 | 8/1973 | Kearney, II | 342/54 |
| 3,997,897 | 12/1976 | Brunner et al. | 342/43 |
| 4,851,849 | 7/1989 | Albersdoerfer | 342/43 |

*Primary Examiner*—T. H. Tubbesing

[57] ABSTRACT

An IFF system comprises an interrogation device having an antenna arrangement operating in the HF or microwave range with a relatively broad radiation characteristic for radiation of coded interrogation pulses and for receiving answer signals. The IFF system cooperates with a position finding device whose transmission pulses are radiated by way of a relatively narrow radiation lobe and wherein the answer signals are triggered in the answering device in response to the arrival of transmission pulses of the position finding device. A pulse laser operating in the optical range and having a very narrow radiation lobe at the transmission radiator is used as the position finding device and an answer signal is only triggered in the answering device with the aid of a control circuit when the transmission pulse of the laser transmitter arrives in a certain section during the interrogation pulse produced by the interrogation transmitter, the duration of the interrogation pulses being essentially greater than the duration of the transmission pulses.

7 Claims, 3 Drawing Sheets

IFF SYSTEM COOPERATING WITH FURTHER POSITION FINDING DEVICE

BACKGROUND OF THE INVENTION

1. Field of the Invention

The present invention relates to an IFF system including an interrogation device having an antenna operating in the HF or microwave range and having a relatively broad radiation characteristic for radiating coded interrogation pulses and for receiving answer signals, and more particularly to such a system which cooperates with a position finding device whose transmission pulses are radiated by way of a relatively narrow radiation lobe and wherein answer signals may be triggered in an answering device in response to arrival of the transmission pulses of the position finding device.

2. Description of the Prior Art

The German Letters Patent 2,051,916 discloses an IFF system having a primary radar device which cooperates with a secondary radar device. As used herein, the term "primary radar" should be taken to mean position determining radar, while the term "secondary radar" should be taken to mean an identification type radar. In the just-mentioned German Letters Patent, at least one sensor is provided in the range of the answering device to react to the arrival of signals transmitted from the primary radar and which processes this information to the answering device. A coded answer is made available in the answering device which, however, is radiated as an answer signal only after the arrival of a signal transmitted from the primary radar device. The transmission pulses of the primary radar device and the interrogation signals of the secondary radar device are thereby positioned in a fixed given time spacing. It should be pointed out that it has been strictly observed in the case of devices heretofore known that a primary radar transmission pulse does not coincide with a secondary radar interrogation signal.

An identification system for determining if a target is a friend or foe is known from the German published application 2,142,944. First of all, an interrogation of the target is carried out with the help of laser transmitting and receiving systems, in order to determine whether a target is a friend (correct answering) or is a foe. If a target is recognized as a friend, a communication system is switched on which also permits information transmission with the help of the laser transmitting and receiving system. In such a case, a transfer to a certain kind of information transmission is therefore carried out after an identification step has been completed. In both cases, however, the same transmission systems are utilized, namely laser transmitters laser receivers.

In the case of secondary radar systems heretofore known, the radiation lobes for the transmission of interrogation signals and for receiving the answer signals are relatively broad. Therefore, the positioning of the target objects with respect to angles becomes very inaccurate. Accordingly, secondary radar devices usually cooperate with primary radar devices to take advantage of the more favorable angle resolution which can be applied for more accurate locating of targets.

Transmission methods operating with laser pulses provide difficulties, since the transmission rate is too low for many imaginable applications. This is particularly true when high power is required, due to large distances. Furthermore, it is difficult to transmit messages safely with a laser transmitter with little loss of information since the transmission path may be impaired due to rain, fog and water vapor, for example. In addition, shadings may very easily occur and the ranges are relatively small. A transmission system for information using only laser signals is therefore not very reliable in a great many applications. This is primarily true when the environment cannot be clearly identified for the transmission path, which is the case when one is concerned with mobile devices.

SUMMARY OF THE INVENTION

The primary object of the present invention, which relates to an IFF system of the type initially mentioned above, is to guarantee very good information transmission with a high angle resolution in azimuth, and, in addition, to secure the entire transmission system with respect to interference, both intentional and unintentional, as far as such is possible.

According to the invention, the aforegoing objectives are attained in such a way that a pulse laser transmitter with a very narrow radiation beam at the transmission radiator is used as a position finding device, operating in the optical range. A reply signal is only triggered in the answering device if a control is present when the transmission pulse of the laser transmitter arrives in a certain section within the duration of the interrogation pulse of the secondary transmitter.

Therefore, the relatively broad interrogation lobe of the microwave or HF interrogation device is no longer decisive for determination of the azimuth, but a very narrow radiation beam characteristic is required of the laser transmitter. The information transmission, however, is still effected in the HF or microwave range, i.e. in a range which is less influenced by atmospheric conditions, shadings, etc. The information transmission may therefore be embodied very safely and with high quality. Intentional or unintentional foreign interferences are eliminated to a great extent in such a way that a certain association of laser transmission pulses, on the one hand, and interrogation signals, on the other hand, is provided. It is very difficult for an intentional interferer to make this accurate association, whereby, in most cases, it is not known to the interferer that this association plays any role at all. The information transmission in the HF or microwave range may be effected almost continuously, since few limitations of the repetition rate are required here, and high directional resolution is not a forced requirement. In addition, an advantage is provided in the fact that, because of the inability to be processed, many replies will not arrive at the interrogation device, since the final resolution of the answer signals is only carried out by the very narrow laser radiation lobe. Therefore, the "garbling" that is known in the secondary radar technique occurs less often, and non synchronous replies are also received less often. No particular requirements are made as to the quality of the laser transmission since it suffices when such a laser pulse is at all received by the answering device. Due to the relatively low pulse repetition frequency of the laser pulses (only corresponding to the repetition frequency of the interrogations), the laser transmitter may correspondingly be simply constructed. An interference of the IFF system constructed in accordance with the present invention, due to continuous line laser interferers is practically avoided, since such large laser energies would be required for this purpose that the expense would not be justified for an interferer, or could not be realized by an interferer.

The undesired triggering of the reply to the enemy interferences may be avoided, in addition, in such a way that the time relation between the HF or microwave interrogation and the correct time section within which the laser pulse must arrive is changed, depending on time. Clocks may be provided for the control of the time-dependent change of the correct section which causes the triggering of a reply in the answering device, on the one hand, and in the interrogation device, on the other hand, whereby these clocks provide synchronism between the two systems. However, it is also possible to inform the answering device from the interrogation station, in accordance with a certain coding schedule about which new time section is to take the place of the former time section.

When the answering system comprises controllable antennas, for example phase-controlled antenna arrangements, it will then be possible, with the help of directional information obtained by the laser pulse, to radiate the HF answer directionally into the direction of the interrogation device. This may be effected with the help of a very weak radiation lobe, as compared with the radiation lobe of the laser beam. The antenna gain obtained thereby is advantageous for resistance to interference and lowering of the transmission power of the answering device, in particular when the interrogation device receives the HF answer directionally.

BRIEF DESCRIPTION OF THE DRAWINGS

Other objects, features and advantages of the invention, its organization, construction and operation will be best understood from the following detailed description taken in conjunction with the accompanying drawings, on which.

DESCRIPTION OF THE PREFERRED EMBODIMENTS

Figure 1:
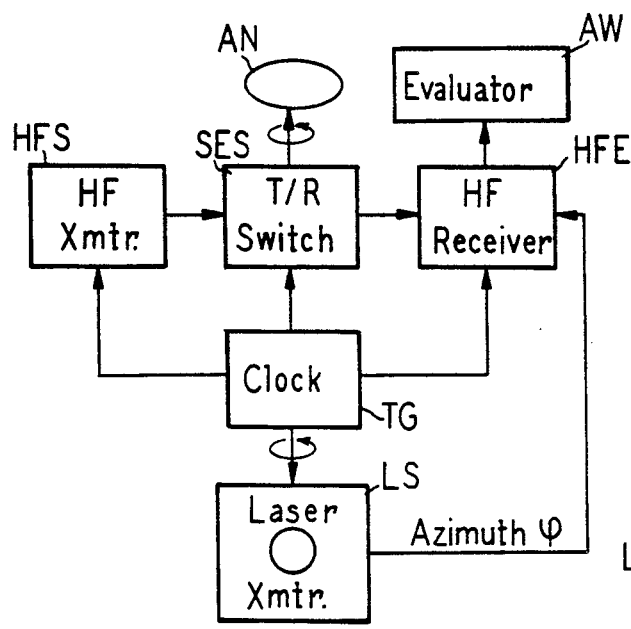
FIG. 1 is a schematic block diagram of the construction of an interrogation device constructed in accordance with the present invention.

In FIG. 1, a HF or microwave transmitter HFS is illustrated. For purpose of simplification, only the HF range is considered in the following discussion. The transmitter HFS is connected to a transmission-reception switch SES for feeding an antenna AN. The receiving branch comprises a microwave or HF receiver HFE connected to the transmission-reception switch SES, and an evaluation circuit AW connected thereto. The control of the HF transmitter and the HF receiver, as well as the transmission-reception switch, is effected by a timing generator TG, hereinafter simply referred to as a clock. The design of the previously described circuit elements essentially corresponds to those of a conventional secondary radar device, which is well known to those skilled in the art, and will not be discussed in further detail herein.

A laser transmitter LS is additionally provided, whereby the transmission of the laser pulses is also controlled by the clock TG. This guarantees that the laser pulses are always transmitted at a certain time with respect to the transmission of the interrogation pulses of the HF transmitter HFS. The transmission of the laser pulses is signaled to the HF receiver HFE by way of an individual line which permits the determination of the accurate distance of the responding target, as well as the azimuth angle from the transit time of the laser pulses until the laser pulses reach the answering device and the HF answer signals return to the HF receiver HFE. The transmission time measurement becomes more accurate than in the case of a pure utilization of only the HF path, since the distance resolution is only determined by the laser accuracy, at least upon the interrogation path. This is primarily true when a pivoting of the laser beam is carried out in the azimuth direction, for example in the manner of a rotating antenna arrangement. In this case, the respective azimuth angle position and the instant of transmission of the laser pulse must be communicated to the HF receiver HFE. The common evaluation at the evaluation circuit AW is effected, for example, by way of representing upon a picture screen, similar to prior art common representation of primary radar and secondary radar information. However, it is also possible to apply a computer in the place of a picture screen, or, in addition thereto, to evaluate the received signals in a manner which is well known in the art. A laser receiver for passive echo signals of the laser transmitter is not provided.

The following definitions are true for the previously used terms "high frequency and microwave range":

1. High frequency range—the wave range which is generally used in order to carry wireless transmissions with radio frequencies, generally frequencies of, for example, 10 KHz to approximately 300 MHz.

2. Microwave range—the range of electromagnetic waves above 30 MHz, up to the boundary of the frequencies obtainable by wave-mechanic processes.

3. Laser frequency range—as opposed to the production of electromagnetic radiation as set forth in 1 and 2 above, laser beams are produced by way of atomic processes and the radiation beam width and direction determination is mainly effected with the help of optical means, as in the case of light waves.

Figure 2:
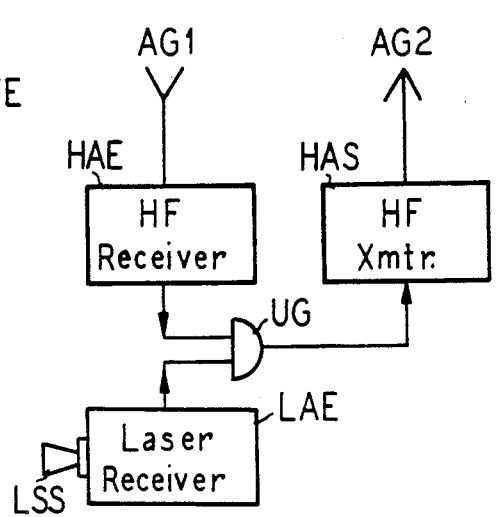
FIG. 2 is a block diagram of an answering device constructed in accordance with the present invention.

The interrogation signals which are emitted by the HF transmitter HFS will reach an answering device which is illustrated in the block diagram in FIG. 2. The HF receiver HAE is triggered, via a receiving antenna AG1, and demodulates the signals in a manner which is well known in the art and decodes the same and makes them available for processing. In addition, a laser receiver LAE is provided in the answering device, comprising a laser sensor LSS. If an output signal occurs at the laser receiver LAE, due to a pulse emitted by the laser transmitter LS of the interrogation station, and if an output signal is present at the receiver HAE at the same time, then the HF transmitter HAS is triggered and an answer signal is returned by way of the antenna AG2, to reach the interrogation station, and is there received by the high frequency receiver HFE. The HF transmitter HAS and the HF receiver HAE may operate in different frequency ranges. The individual features of the AND linkage of the two signals of the HF receiver HAE and the laser receiver LAE via the AND gate UG are set forth in detail below with the help of FIGS. 6-8.

Figure 3:
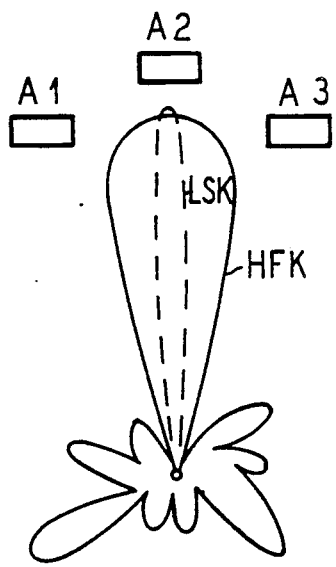
FIG. 3 is a schematic representation of the radiation pattern for the HF or microwave interrogation and the laser transmission.

In FIG. 3, the radiation diagram of the antenna AN of FIG. 1 is referenced HFK. One is thereby concerned with a relatively broad main radiation lobe and a fairly large number of side lobes. The radiation lobe of the laser transmitter LS of FIG. 1 is referenced LSK, and is represented as a broken line. The lobe LSK has practically no side lobes. A plurality of answer devices A1-A3 are schematically illustrated in FIG. 3. FIG. 3 illustrates that, although all three answer devices A1-A3 are positioned in the radiation range of the main lobe HFK, a reply is provided only the answering device A2 since only the answering device A2 is reached by the comparatively narrow radiation lobe LSK of the laser transmitter LS of FIG. 1 simultaneously with the radiation from the HF transmitter. If a rotating or pivoting of the radiation lobe HFK is provided, the radiation lobe LSK of the laser transmitter must also be pivoted in synchronism therewith.

Figure 4:
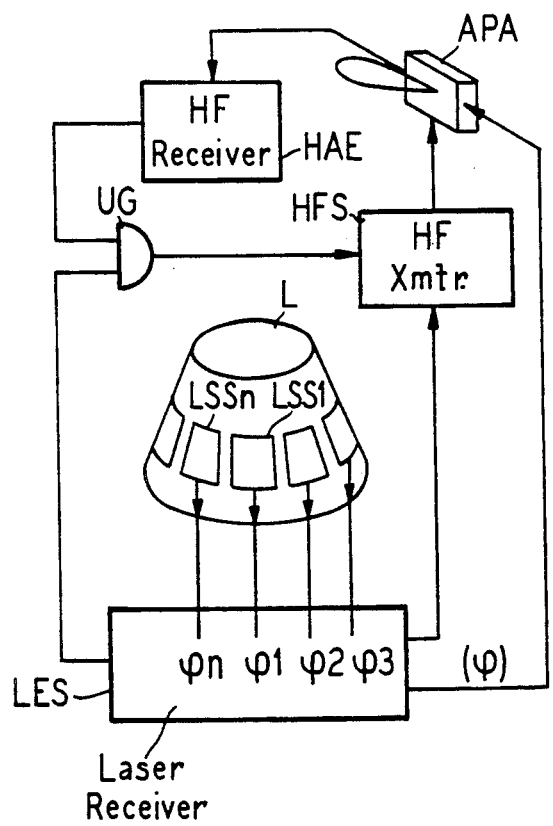
FIG. 4 is a schematic block diagram of an answering device having selective control of the HF or microwave antenna.

An on-target transmission of the answer signals may be obtained in an advantageous manner, in the case of an answering device constructed in accordance with FIG. 4, in such a way that the sensors of the laser receiver are present in multiple, and are directed in different azimuth directions. For example, this may be obtained in such a manner that the sensors LSS1-LSSn are arranged upon the circumference of a frustum, in an even distribution. The associated laser receiver LES receives the output signals of all laser sensors LSS1-LSSn separately, and thus determine the azimuth angle range within which an interrogation has been effected. The interrogation device must then also be positioned in this direction. If, for example, the laser pulse arrives in the angle range $\phi3$, then such information is processed to the electrically controlled antenna arrangement APA. The antenna arrangement is adjusted in such a way that its main radiation direction is at the azimuth angle $\phi3$.

Figure 5:
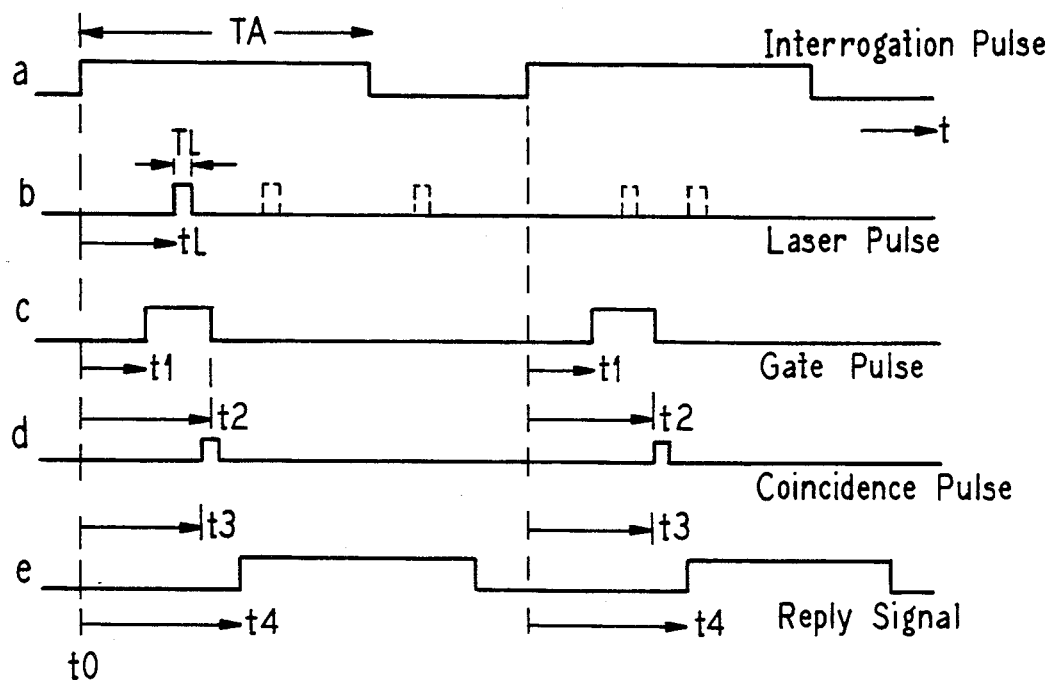
FIG. 5 is a pulse chart to aid in understanding the present invention.

In the case of the pulse diagram of FIG. 5, the interrogation pulses are illustrated in the line a. Usually, one is concerned with coded signals (pulse trains) of a fairly great length which enable the desired information transmission between the interrogation station, on the one hand, and the answering station, on the other hand. For purpose of simplification, only pulses are referred to in the following discussion, and the coding has not been illustrated in detail, coded interrogation signals being well understood by those skilled in the art. The duration of the pulses is referenced TA. The laser pulses of the laser transmitter LS of FIG. 1 are illustrated in line b. Of concern here are very short pulses having steep edges at a duration TL. The pulse repetition frequency for the laser pulses is either equal to the pulse repetition frequency of the interrogation pulses, or an integer fraction thereof. This is required, in particular, when the load of the laser transmitter LS of FIG. 1 is to be maintained small, which can be obtained by way of a lower pulse repetition frequency.

Since a (usually coded) answer signal is only to be triggered when the laser pulse, in accordance with line b, arrives at a certain instant during the interrogation pulse of line a, a gate pulse is produced (line c) having a somewhat greater duration than the laser pulse of line b. While the laser pulse in line b starts at a time tL, the beginning of the gate pulse, as seen in line c, begins shortly before that time, namely at the time t1, and it ends at the time t2. Both times are with respect to the beginning of the interrogation pulse of line a. If both pulses of the laser and the gate (lines b and c) are supplied to a coincidence gate (AND gate), an output pulse will be produced which is of the form illustrated in line d. The position of this output pulse (the pulse of line d) depends on the selection of the delay times of the gate circuits; however, in any case, it is positioned at, or after, the laser pulse of line b, with respect to time. In the case of the present example, a time t3 is assumed after the beginning of the interrogation pulse of line a before the leading edge of the output pulse of line d.

The line e illustrates an answer signal which is triggered due to the coincidence pulse of line d. This reply signal begins at a time t4, positioned after the time t3 of the coincidence pulse of line d, with respect to time. Again, an answer signal is coded and has a greater length, corresponding to the amount of information available for the information transmission, as well as the required address and characterizations or the like. The above-described process repeats periodically, in accordance with the selected pulse repetition frequency. The respectively mentioned time shifts are selected as fixed values and may, as well known in the art, be considered during the transit time determination within the framework of the distance measurement.

Other laser pulses are illustrated in broken line form in line b and they be transmitted from intentional or unintentional interferers, for example, or also from other interrogation devices. Since no coincidence is provided between these laser pulses and the gate pulse in line c, these laser pulses will not trigger answering signals.

In order to be better able to avoid enemy interferences, there is a possibility of triggering reply signals through another section of the coincidence between the interrogation pulse of line a and the laser pulse of line b. For example, this may be caused in such a way that the laser pulse travels over the entire interrogation pulse illustrated in line a, in accordance with a certain program, namely from interrogation to interrogation, or, after several interrogations, and is respectively positioned at another location. This traveling of the laser pulse may be carried out continuously, for example from the beginning of the interrogation pulse to the end thereof, or it may also be statistically distributed over the corresponding section of the interrogation pulse. For control purposes, a clock is advantageously provided both in the interrogation section as well as in the answer section. It is thereby most simple to control the time positions of the laser pulses, since the same are designed very short and in a simple manner.

Figure 6:
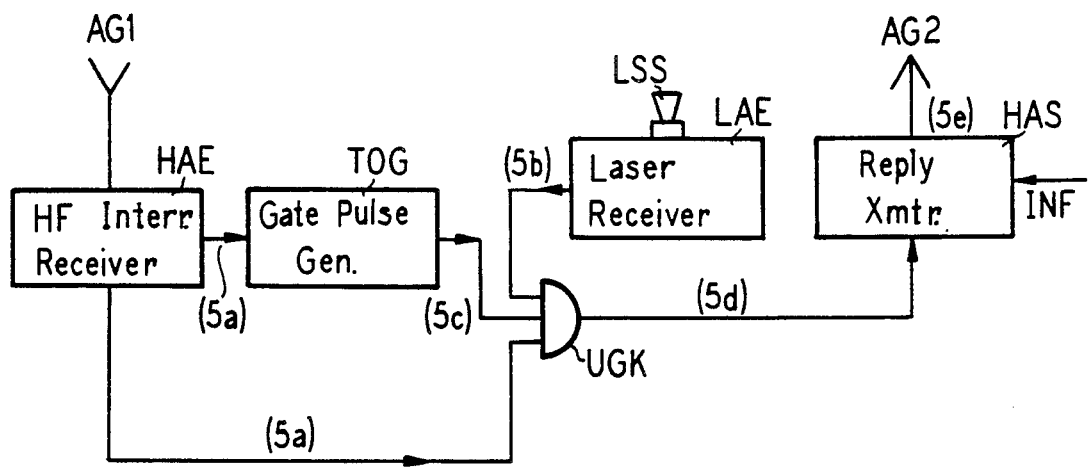
FIG. 6 is a block diagram representation of a circuit arrangement for the pulse distribution of FIG. 5.

FIG. 6 illustrates a block diagram of a circuit arrangement which permits execution of the processes described in FIG. 5. The pulses in accordance with lines a-e of FIG. 5 are noted in parenthesis in FIG. 6 with the figure and line designations of FIG. 5. The HF interrogation signals reach the HF receiver HAE by way of the receiving antenna AG1. The demodulated and possibly decoded, interrogation signal is directly supplied to the AND gate UGK by way of a line extending from the output of the receiver HAE. Furthermore, this output signal of the HF receiver HAE will reach the gate pulse generator TOG which produces the gate pulse of line c. A corresponding time shift by the value t1 in accordance with line c is to be provided. The duration of the gate pulse (time difference t2−t1) is fixed by the gate pulse generator TOG. Thus, the gate pulse of line c is present at the output, and is also supplied to the AND gate UGK.

The laser pulse of line b, FIG. 5, reaches the laser receiver LAE by way of the laser sensor LSS and, from there, the third input of the AND gate UGK. The signal of line d in FIG. 5 is provided at the output of the AND gate UGK and serves for triggering the answer transmitter HAS. In addition, the required information (indicated by the arrow INF) can be added for modulation in a manner well known in the art, as such information is to be transmitted to the interrogation station. The answer signal, in accordance with FIG. 5, line e is transmitted back to the interrogation station by way of the antenna AG2.

The application of coded interrogation signals permits a particularly simple control, on the one hand, or assignment, on the other hand, of the time section of the interrogation signal to the laser pulse. Individual features pertaining hereto are explained below with the help of FIG. 7. A coded interrogation signal is illustrated in line a, and comprises 4 code words c1, c2, c3 and c4. Each of these code words is assumed to be 4 bits. The code word c1 consist of the bits 1, 0, 1, 0. The code word 2 consists of the bits 0, 1, 0, 1. The code word c3 consists of the bits 0, 1, 1, 0. The code word c4 consists of the bits 0, 1, 0, 0. When the code word c2 is assigned to the respective answer device as an address or characterization, respectively, then the laser pulse, in accordance with line b is to be transmitted shortly before the code word c2. In the present case, it is assumed that the laser pulse arrives at the answering device at the time tL (approximately after the duration of 3 bits) after the beginning of the interrogation signal in accordance with line a. At the end of the laser pulse of the duration tL, a gate signal is triggered at the answering device or produced there, respectively, consisting of the bits 0, 1, 0, 1, and thus to the code c2 in accordance with line a. This coded gate signal is illustrated in the line c beginning at the time t5 (end of duration tL) and, timewise, is positioned exactly in accordance with the code word c2 of line a, ending at the time t6. If a coincidence test is carried out for each individual bit of the code word c2 of line a and the coded gate signal of line c, then a coincidence pulse is output at the positive termination of the coincidence test at the time t7, as illustrated in the line d.

Figure 7:
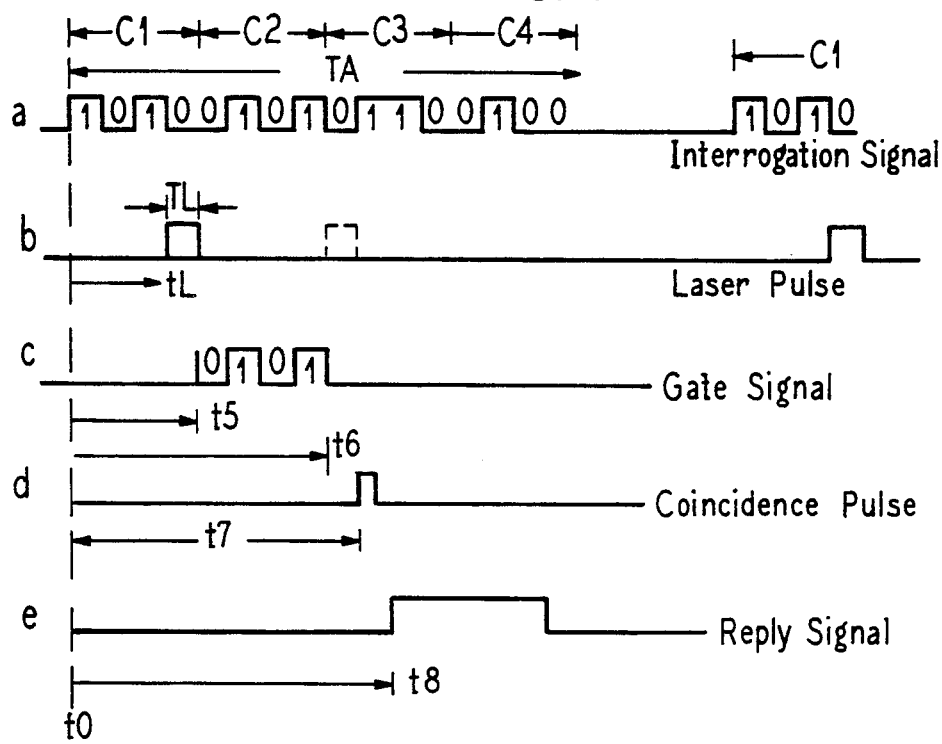
FIG. 7 is a pulse-time diagram showing coded interrogation.
Figure 8:
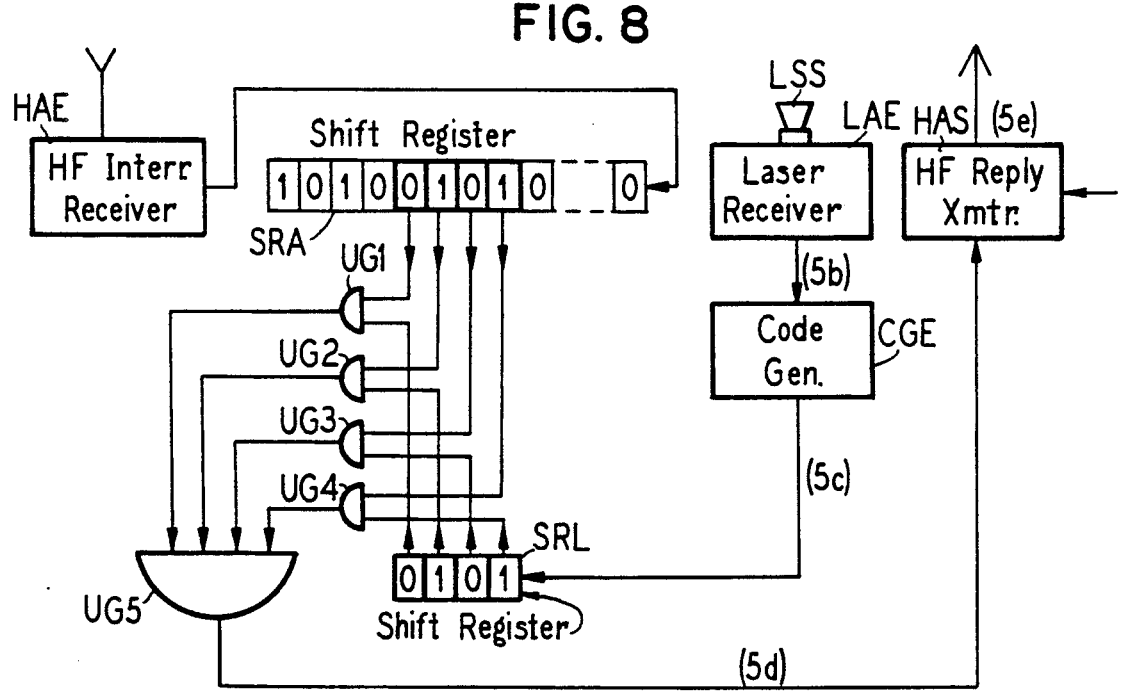
FIG. 8 is a block diagram representation of a circuit arrangement having the pulse distribution illustrated in FIG. 7.

In the case of the associated circuit arrangement in accordance with FIG. 8, the interrogation signal (FIG. 7, line a) reaches a shift register SRA by way of the HF interrogation receiver HAE. This shift register must comprise at least as many register positions that the coincidence test can be carried out. If the second code word is always only used for the coincidence test, an eight digit shift register will suffice in the present example. If, however, a change of the time section is provided within which the coincidence test is to be carried out (with corresponding change of the position of the laser pulse), then the shift register SRA must extend over the full length of the interrogation signal in accordance with line a of FIG. 7. Those positions of a shift register SRA which contain the respective code word c2 at the instant of the arrival of the laser pulse in accordance with line b (framed by a thickened line) are provided with taps which are extended toward the AND gate UG1, UG2, UG3 and UG4.

The laser pulse of line b in FIG. 7 reaches the laser receiver LAE by way of the laser sensor LSS, and from there is extended to a code generator CGE. The code generators CGE produces that code which is to be used for the coincidence test. For the example illustrated in FIG. 7, the code word c2 must thus be produced and extended to a shift register SRL. In the case of a respectively variable association of code words for the coincidence formation, the code generator CGE must produce other code words in respectively other time positions, in a succession, for example the code word c4 after the code word c2, and then the code word c1, etc. The associated laser pulse must also be varied with time, correspondingly i.e. must be directly positioned ahead of the code words c2, c4, c1, etc. The shift register SRL is also provided with taps which are extended to the AND gates UG1–UG4. With these connections, corresponding register positions of the two shift registers SRA and SRL are respectively connected with the same AND gate. Since the code word c2 is present in the shift register SRA, in the corresponding partial range, the corresponding code word will also occur in the shift register SRL. All inputs are occupied at all AND gates UG1–UG4, and 4 output signals are produced simultaneously which are supplied to the AND gate UG5. This gate supplies an output pulse which is illustrated in line d of FIG. 7 and which is supplied to the answering transmitter HAS to trigger that transmitter, as indicated at the time t8 in line e of FIG. 7.

It is true that a faulty laser pulse, as it has been illustrated in a broken line in line b, also causes the triggering of the code generators CGE. The code word 0, 1, 0, 1, which is produced, however, does not cause a coincidence with the associated portion of the interrogation signal with the coding 1, 1, 0, 0; and a reply is therefore not provided.

In order to be able to avoid, for example, an overlapping of answering signals, one may proceed in such a way that, if several answering devices are used, a different section within the respective interrogation pulses (FIG. 5, line a and FIG. 7, line a) of the interrogation transmitter HFS, triggers an answer signal for each answering device in the case of a time-correct arrival of a transmission pulse (FIG. 5, line b and FIG. 7, line b) of the laser transmitter LS, which is also varied with respect to time. Thus, the different answering devices reply at respectively different times, depending on when the correct association of the respective transmission pulses of the interrogation device is given. Since it may be presumed that the interrogation device knows the respective coincidence range of the answering device, it is possible to trigger on-target replies at a certain answering device.

In the case of a variation of the coincidence ranges, one will advantageously proceed in such a manner that the section which causes the triggering of answering signals is time-dependently variable within the answering device, with the help of a clock, and that the time position of one of the transmission pulses (FIG. 5, line b and FIG. 7, line b), preferably that of the laser pulses, can analogously be varied at the interrogation device. This makes enemy interference much more difficult.

A clock control may be avoided in such a way that the information concerning which section of the interrogation pulse (FIG. 5, line a and FIG. 7, line a) of the interrogation transmitter HFS is respectively to be used for the triggering of answering signals (FIG. 5, line c and FIG. 7, line c), is transmitted with the interrogation pulse to the answering device. For example, a certain code word may indicate that the following code word is to proceed into coincidence with the laser pulse. For example, the code word c1 of FIG. 7, line a might be positioned as desired within the interrogation, with respect to time, and indicate that the code word c2, which actually determines the coincidence, is the next code word to arrive.

It may also be advantageous that the composition of the interrogation pulses (FIG. 5, line a, and FIG. 7, line a) at the interrogation transmitter HFS be changed, depending on time, in such a way that sections in different positions within the interrogation pulse respectively cause a triggering of answering signals.

The circuit constructed in accordance with FIG. 8 may also be embodied in such a way that a decoding of the address of coded interrogation pulses is effected in the answering device, that, in the case of the correct address, a release signal is produced which will trigger a reply only together with the correct time section coincidence of a successive transmission signal of the interrogation device.

During the design of the pulse frequencies, one may advantageously proceed in such a manner that the pulse frequency of the transmission pulses of the laser transmitter is essentially smaller than the pulse frequency of the interrogation pulses. In this situation, a logic circuit may be introduced which releases a certain number of answers (for example six) in accordance with a coincidence. Then, a new coincidence must occur if the release of answer signals is to be continued. It may be added as a limiting feature that the following (for example six) HF interrogations, which are not released due to coincidence, must have the same coding as the interrogation by which coincidence had occurred.

Although the present invention has been described by reference to particular illustrative embodiments thereof, many changes and modifications of the invention may become apparent to those skilled in the art without departing from the spirit and scope of the invention. It is therefore intended that the patent warranted hereon cover all such changes and modifications as may reasonably and properly be included within the scope of this contribution to the art.

What is claimed is:

1. IFF apparatus comprising:
    first transmission means operable to transmit first signals as interrogation signals with a broad radiation characteristic;
    second transmission means operable to transmit second signals with a narrow radiation lobe directed within the broad radiation lobe;
    first receiving means for receiving said first signals;
    second receiving means for receiving said second signals;
    control means connected to said first and second receiving means and responsive to the occurrence of a second signal within a predetermined time section of a first signal to produce a trigger;
    third transmission means connected to said control means and responsive to a trigger to transmit a third signal as an answer signal; and
    third receiving means for receiving third signals, including evaluation means for evaluating the third signals.

2. The IFF apparatus of claim 1, wherein said first transmission means includes a HF transmitter operable to transmit first signals of a first duration, and said second transmission means includes a laser transmitter operable to transmit second signals of a lesser second duration.

3. The IFF apparatus of claim 1, wherein said control means includes timing means connected to said first receiving means to produce an output at a predetermined time after the beginning of a first signal, and gate means connected to said first and second receiving means and to said timing means to produce said trigger upon coincidence of the outputs of said first and second receiving means and said timing means.

4. The IFF apparatus of claim 1, comprising a plurality of said second receiving means and said third transmission means and said control means, each of said control means producing a trigger in response to occurrence of a second signal within a respective predetermined time section of a first signal.

5. An IFF system comprising:
    an interrogation station and at least one target including a transponder;
    a first HF transmitter and an antenna coupled thereto in said interrogation station for transmitting coded interrogation pulses toward the target with a broad radiation lobe;
    a laser transmitter in said interrogation station for transmitting laser pulses toward the target in a narrow radiation pattern within the broad radiation lobe;
    transmission control means connected to said first HF transmitter and laser transmitter to effect laser transmission within the duration of the interrogation pulses;
    a first HF receiver in said transponder for receiving the interrogation pulses;
    a laser receiver in said transponder for receiving the laser pulses;
    control means connected to said first HF receiver and to said laser receiver to produce a trigger in response to receipt of a laser pulse within a predetermined time section of the interrogation pulses;
    a second HF transmitter in said transponder connected to said control means and responsive to the trigger to transmit coded answer pulses;
    a second HF receiver coupled to said antenna for receiving the coded answer pulses; and
    decoding and evaluating means connected to said second HF receiver.

6. A method of identifying a target as a friend or foe at an interrogation station having transmitting and receiving equipment and the target including a transponder, comprising the steps of:
    transmitting a HF interrogation signal in a wide radiation lobe toward the target, and at the same time transmitting a laser pulse toward the target in a narrow pattern within the wide pattern;
    receiving the HF interrogation signal and the laser pulse at the target target transponder;
    comparing the time position of the received laser pulse with respect to the received interrogation signal and generating a trigger when the received laser pulse coincides with a predetermined time section of a received interrogation signal;
    transmitting a HF answer signal with the transponder in response to generation of the trigger; and receiving and evaluating the HF answer signal at the interrogation station.

7. A method of identifying a friend or foe target, comprising the steps of:

at an interrogation station, scanning a target area with a wide radiation lobe microwave transmission of interrogation signals while simultaneously scanning the target area with laser pulses in a narrow radiation lobe;

receiving the microwave and laser signals at a target;

transmitting microwave answer signals from the target in response to receipt of a laser pulse during a certain time section of a microwave interrogation signal; and receiving and evaluating the microwave answer signals at the interrogation station.

* * * * *